(12) United States Patent
Manning et al.

(10) Patent No.: US 9,168,638 B2
(45) Date of Patent: Oct. 27, 2015

(54) ABRASIVE PRODUCTS AND METHODS FOR FINISHING HARD SURFACES

(71) Applicants: James J. Manning, Braintree, MA (US); Mark E. Sternberg, Bryn Mar, PA (US); Jianna Wang, Grafton, MA (US)

(72) Inventors: James J. Manning, Braintree, MA (US); Mark E. Sternberg, Bryn Mar, PA (US); Jianna Wang, Grafton, MA (US)

(73) Assignees: Saint-Gobain Abrasives, Inc., Worcester, MA (US); Saint-Gobain Abrasifs, Conflans-Sainte-Honorine (FR)

(*) Notice: Subject to any disclaimer, the term of this patent is extended or adjusted under 35 U.S.C. 154(b) by 443 days.

(21) Appl. No.: 13/630,375

(22) Filed: Sep. 28, 2012

(65) Prior Publication Data

US 2013/0095731 A1    Apr. 18, 2013

Related U.S. Application Data

(60) Provisional application No. 61/540,946, filed on Sep. 29, 2011.

(51) Int. Cl.
| | |
|---|---|
| *B24D 11/00* | (2006.01) |
| *B24D 3/28* | (2006.01) |
| *B24B 1/00* | (2006.01) |
| *B24B 29/00* | (2006.01) |
| *C09K 3/14* | (2006.01) |

(52) U.S. Cl.
CPC ... *B24D 3/28* (2013.01); *B24B 1/00* (2013.01); *B24B 29/00* (2013.01); *B24D 11/001* (2013.01); *C09K 3/1409* (2013.01)

(58) Field of Classification Search
CPC ...... B24D 11/00; B24D 11/28; C09K 3/1436; C09D 163/00
USPC .................. 451/41, 28; 51/297, 298, 295, 293
See application file for complete search history.

(56) References Cited

U.S. PATENT DOCUMENTS

| | | |
|---|---|---|
| 2,277,520 A | 3/1942 | Martin et al. |
| 3,916,584 A | 11/1975 | Howard et al. |
| 3,928,949 A | 12/1975 | Wagner |
| 4,018,574 A | 4/1977 | Dyer |

(Continued)

FOREIGN PATENT DOCUMENTS

| | | |
|---|---|---|
| CN | 1088506 A | 6/1994 |
| CN | 1355769 A | 6/2002 |

(Continued)

OTHER PUBLICATIONS

SK Chemicals Co., Ltd., "Skybon ES-120 Thermoplastic Copolyester for Solventborne Applications," 1 pg.

(Continued)

*Primary Examiner* — Robert Rose
(74) *Attorney, Agent, or Firm* — Joseph P. Sullivan; Abel Law Group, LLP

(57) ABSTRACT

A coated abrasive product includes green, unfired abrasive aggregates having a generally spheroidal or toroidal shape, the aggregates formed from a composition comprising abrasive grit particles and a nanoparticle binder, wherein the abrasive aggregates are dispersed within a polymer resin coating, and wherein the coated abrasive product is capable of superfinishing a metal surface having an initial Ra in the range of about 1.5 micro inches to about 12.5 micro inches prior to application of the coated abrasive product and after application the surface has an Ra of less than 1.0 micro inch.

15 Claims, 6 Drawing Sheets

(56) References Cited

U.S. PATENT DOCUMENTS

| | | | |
|---|---|---|---|
| 4,311,489 A * | 1/1982 | Kressner | 51/298 |
| 4,547,204 A | 10/1985 | Caul | |
| 4,576,612 A | 3/1986 | Shukla et al. | |
| 4,609,380 A | 9/1986 | Barnett et al. | |
| 4,629,473 A | 12/1986 | Ruid et al. | |
| 4,644,703 A | 2/1987 | Kaczmarek et al. | |
| 4,652,275 A | 3/1987 | Bloecher et al. | |
| 4,751,138 A | 6/1988 | Tumey et al. | |
| 4,842,619 A | 6/1989 | Fritz et al. | |
| 4,867,759 A | 9/1989 | Tiefenbach et al. | |
| 4,918,874 A | 4/1990 | Tiefenbach, Jr. | |
| 4,920,082 A | 4/1990 | Danielson | |
| 4,927,431 A * | 5/1990 | Buchanan et al. | 51/298 |
| 5,011,513 A | 4/1991 | Zador et al. | |
| 5,014,468 A | 5/1991 | Ravipati et al. | |
| 5,094,670 A | 3/1992 | Imada | |
| 5,108,463 A | 4/1992 | Buchanan | |
| 5,137,542 A | 8/1992 | Buchanan et al. | |
| 5,198,292 A | 3/1993 | Lerner et al. | |
| 5,219,462 A | 6/1993 | Bruxvoort et al. | |
| 5,250,085 A | 10/1993 | Mevissen | |
| 5,256,170 A | 10/1993 | Harmer et al. | |
| 5,304,586 A | 4/1994 | Hammesfahr et al. | |
| 5,328,716 A | 7/1994 | Buchanan | |
| 5,360,462 A | 11/1994 | Harmer et al. | |
| 5,431,596 A | 7/1995 | Akita | |
| 5,436,063 A | 7/1995 | Follett et al. | |
| 5,437,754 A | 8/1995 | Calhoun | |
| 5,453,312 A | 9/1995 | Haas et al. | |
| 5,454,844 A | 10/1995 | Hibbard et al. | |
| 5,549,719 A | 8/1996 | Lee et al. | |
| 5,584,897 A * | 12/1996 | Christianson et al. | 51/295 |
| 5,632,668 A | 5/1997 | Lindholm et al. | |
| 5,667,541 A | 9/1997 | Klun et al. | |
| 5,672,097 A | 9/1997 | Hoopman | |
| 5,730,764 A | 3/1998 | Williamson et al. | |
| 5,766,277 A * | 6/1998 | DeVoe et al. | 51/295 |
| 5,833,724 A | 11/1998 | Wei et al. | |
| 5,840,088 A | 11/1998 | Yang et al. | |
| 5,863,239 A | 1/1999 | Barton, II | |
| 5,863,306 A | 1/1999 | Wei et al. | |
| 5,863,847 A | 1/1999 | DeVoe et al. | |
| 5,876,268 A | 3/1999 | Lamphere et al. | |
| 5,906,490 A | 5/1999 | Kramer Primus et al. | |
| 5,913,716 A | 6/1999 | Mucci et al. | |
| 5,924,917 A | 7/1999 | Benedict et al. | |
| 5,954,844 A | 9/1999 | Law et al. | |
| 6,024,634 A | 2/2000 | Hoglund et al. | |
| 6,074,281 A | 6/2000 | Swanson et al. | |
| 6,077,601 A | 6/2000 | DeVoe et al. | |
| 6,155,910 A | 12/2000 | Lamphere et al. | |
| 6,171,224 B1 | 1/2001 | Phillips | |
| 6,197,076 B1 | 3/2001 | Braunschweig et al. | |
| 6,231,629 B1 | 5/2001 | Christianson et al. | |
| 6,238,450 B1 | 5/2001 | Garg et al. | |
| 6,258,136 B1 | 7/2001 | Kinisky et al. | |
| 6,261,682 B1 | 7/2001 | Law | |
| 6,287,184 B1 | 9/2001 | Carpentier et al. | |
| 6,372,336 B1 * | 4/2002 | Clausen et al. | 428/323 |
| 6,375,692 B1 | 4/2002 | Manwiller et al. | |
| 6,395,044 B1 | 5/2002 | Swei et al. | |
| 6,406,576 B1 | 6/2002 | Benedict et al. | |
| 6,451,076 B1 | 9/2002 | Nevoret et al. | |
| 6,517,423 B2 | 2/2003 | Ueno | |
| 6,551,366 B1 | 4/2003 | D'Souza et al. | |
| 6,551,974 B1 | 4/2003 | Conrad et al. | |
| 6,645,624 B2 | 11/2003 | Adefris et al. | |
| 6,648,999 B2 | 11/2003 | Burdon et al. | |
| 6,702,650 B2 | 3/2004 | Adefris | |
| 6,753,359 B2 | 6/2004 | Thurber et al. | |
| 6,773,475 B2 | 8/2004 | Ohishi | |
| 6,790,126 B2 | 9/2004 | Wood et al. | |
| 6,797,023 B2 | 9/2004 | Knapp et al. | |
| 6,858,292 B2 | 2/2005 | Kendall | |
| 6,953,381 B2 | 10/2005 | Siders et al. | |
| 7,005,080 B2 | 2/2006 | Holland et al. | |
| 7,066,801 B2 | 6/2006 | Balijepalli et al. | |
| 7,279,119 B2 | 10/2007 | Hellring et al. | |
| 7,294,158 B2 | 11/2007 | Welygan et al. | |
| 7,594,845 B2 | 9/2009 | Lugg et al. | |
| 7,658,665 B2 | 2/2010 | Subramanian et al. | |
| 7,935,158 B2 | 5/2011 | Querel et al. | |
| 7,981,173 B2 | 7/2011 | Ali et al. | |
| 8,038,751 B2 | 10/2011 | Starling | |
| 8,043,393 B2 | 10/2011 | Querel et al. | |
| 8,062,098 B2 | 11/2011 | Duescher | |
| 8,105,453 B2 | 1/2012 | Kawamura et al. | |
| 8,361,176 B2 | 1/2013 | Seth et al. | |
| 2001/0003884 A1 | 6/2001 | Wei et al. | |
| 2002/0090891 A1 | 7/2002 | Adefris et al. | |
| 2003/0066246 A1 | 4/2003 | Swei et al. | |
| 2003/0150169 A1 | 8/2003 | Annen | |
| 2003/0175498 A1 | 9/2003 | Hunt et al. | |
| 2003/0213182 A1 | 11/2003 | Knapp et al. | |
| 2004/0067649 A1 | 4/2004 | Hellring et al. | |
| 2004/0115431 A1 | 6/2004 | Chen et al. | |
| 2005/0064805 A1 | 3/2005 | Culler et al. | |
| 2005/0113005 A1 | 5/2005 | Woo et al. | |
| 2005/0223649 A1 | 10/2005 | O'Gary et al. | |
| 2006/0026904 A1 | 2/2006 | Woo et al. | |
| 2006/0046622 A1 | 3/2006 | Prasad | |
| 2006/0148392 A1 | 7/2006 | Ono et al. | |
| 2006/0183412 A1 | 8/2006 | Allison et al. | |
| 2006/0260208 A1 | 11/2006 | Swei et al. | |
| 2007/0066197 A1 | 3/2007 | Woo et al. | |
| 2007/0243802 A1 | 10/2007 | Petersen et al. | |
| 2007/0298240 A1 | 12/2007 | Gobena et al. | |
| 2008/0092455 A1 | 4/2008 | You | |
| 2008/0172951 A1 * | 7/2008 | Starling | 51/308 |
| 2009/0011692 A1 | 1/2009 | Miekka et al. | |
| 2010/0005727 A1 | 1/2010 | Gaeta et al. | |
| 2010/0022170 A1 | 1/2010 | Starling et al. | |
| 2010/0107509 A1 | 5/2010 | Guselin | |
| 2010/0159805 A1 | 6/2010 | Goldsmith et al. | |
| 2011/0045739 A1 | 2/2011 | Keijzer et al. | |
| 2011/0053460 A1 | 3/2011 | Culler et al. | |
| 2012/0094579 A1 | 4/2012 | Starling | |
| 2012/0192500 A1 | 8/2012 | Wang et al. | |

FOREIGN PATENT DOCUMENTS

| | | |
|---|---|---|
| CN | 1481296 A | 3/2004 |
| CN | 1483067 A | 3/2004 |
| CN | 1787966 A | 6/2006 |
| CN | 101068656 A | 11/2007 |
| CN | 101267915 A | 9/2008 |
| DE | 2350139 | 4/1975 |
| EP | 193296 A1 | 9/1986 |
| EP | 444824 A2 | 9/1991 |
| EP | 211591 B1 | 3/1993 |
| EP | 650803 A1 | 5/1995 |
| EP | 1339531 B1 | 8/2007 |
| EP | 2436747 A3 | 4/2012 |
| JP | 61192479 | 8/1986 |
| JP | 61297083 | 12/1986 |
| JP | 6234780 A | 2/1987 |
| JP | H01303626 | 12/1989 |
| JP | H04500044 A | 1/1992 |
| JP | 63052971 | 3/1998 |
| JP | 10-202538 A | 8/1998 |
| JP | 2003011068 | 1/2003 |
| JP | 2003062754 | 3/2003 |
| JP | 2003071729 | 3/2003 |
| JP | 2003511249 | 3/2003 |
| JP | 2004174712 | 6/2004 |
| JP | 2005515950 A | 6/2005 |
| JP | 2005522341 | 7/2005 |
| JP | 2006510499 | 3/2006 |
| JP | 2008000853 | 1/2008 |
| TW | 200422366 A | 11/2004 |
| WO | 9001397 A1 | 2/1990 |
| WO | 9201536 A1 | 2/1992 |
| WO | 0236338 A2 | 5/2002 |
| WO | 02102920 A1 | 12/2002 |

(56) References Cited

FOREIGN PATENT DOCUMENTS

| WO | 2005099280 A2 | 10/2005 |
|---|---|---|
| WO | 2006050792 A1 | 5/2006 |
| WO | 2006112909 A1 | 10/2006 |
| WO | 2007035292 A1 | 3/2007 |
| WO | 2008008535 A1 | 1/2008 |
| WO | 2088091939 A3 | 7/2008 |
| WO | 2010011579 A2 | 1/2010 |
| WO | 2010075041 A2 | 7/2010 |

OTHER PUBLICATIONS

Norton, Saint-Gobain, "High-Performance Lapping Products for Roll Finishing," Copyright Saint-Gobain Abrasives Inc., Rev. Feb. 2011, 2 pgs.
Burgess Pigment, "Burgess No. 96, Hydrous Aluminum Silicate" 1 pg.
ADM, "Material Safety Data Sheet—Yelkin TS", Preparation Date: Apr. 17, 2009, Revision Date: Apr. 17, 2009, 7 pgs.
Momentive, "Technical Data Sheet, EPON™ Resin 1001F", Re-issued Sep. 2007, 4 pgs.
Carbide Depot, "Hardness Converstion Chart", Technical Resources for Manufacturing Professionals, 3 pgs.
Woods, Susam, Cutting Tool Engineering Plus, "High-Velocity Grind", Feb. 2011, vol. 63, Issue 2, 9 pgs.
Werner Blank, "Isocyanate TDI Isocyanate", Last edited on: Jul. 6, 2006, 3 pgs.
BYK Additives & Instruments, "BYK-410 Material Safety Data Sheet" Version 4, Revision Date Feb. 7, 2011, Print Date Feb. 7, 2011, 10 pgs.
BYK Additives & Instruments, "BYK-410 Data Sheet—Liquid Rheology Additives for Solvent-borne and Solvent-free Systems" Data Sheet R200, issue Feb. 2010, 4 pgs.
Rohm and Haas, "Adcote™ 545S/Coreactant F", Copyright Rohm and Haas, 2008, 3 pgs.
3M Innovation, "Systematic Processes for Finishing Wear Resistant Thermal Spray Coatings with Flexible Superabrasives," Sponsored by ESTCP, JG-PP, PEWG, Nov. 19, 2003, 31 pgs.
3M Corporation, "Roll Grinding, Supertinishing and Microfnishing Systems," Superabrasives and Microfinishing Systems Division, Copyright 3M 1996, 12 pgs.
SKChemicals, Skybon Product Info, accessed Apr. 28, 2012 at http://www.skchemicals.com/english/products/poly/sub/sub3-1.asp, 2 pgs.
Cytec "Cymel® Amino Resin Crosslinkers for the Coating Industry, Product and Appiication Guide, Europe, Middle East and Africa", Copyright 2008 Cytec Industries, Inc., 42 pgs.
Air Products "Dabco© T-12 Catalyst", Copyright, Air Products and Chemicals, Inc., 2003, 2 pgs.
International Search Report for PCT/US2008/051785 mailed Aug. 6, 2008, 1 pg.
International Search Report for PCT/US2009/051045 mailed Mar. 3, 2010, 1 pg.
International Search Report for PCT/US2009/067914 mailed Jul. 26, 2010, 1 pg.
International Search Report for PCT/US2013/032402 mailed Jul. 1, 2013, 1 pg.
International Search Report for PCT/US2012/057852 mailed Mar. 5, 2013, 1 pg.
International Search Report for PCT/US2013/021039 mailed Apr. 25, 2013, 1 pg.
International Search Report for PCT/US2013/034700 mailed Jul. 13, 2013, 1 pg.
International Search Report for PCT/US2011/068249 mailed Aug. 29, 2012, 1 pg.

* cited by examiner

ABRASIVE PRODUCTS AND METHODS FOR FINISHING HARD SURFACES

CROSS-REFERENCE TO RELATED APPLICATION(S)

The present application claims priority from U.S. Provisional Patent Application No. 61/540,946, filed Sep. 29, 2011, entitled "ABRASIVE PRODUCTS AND METHODS FOR FINISHING HARD SURFACES," naming inventors James Manning, Mark Sternberg and Jianna Wang, which application is incorporated by reference herein in its entirety.

BACKGROUND

1. Field of the Disclosure

The present disclosure is generally directed to abrasive products and methods related to the polishing and finishing of hard surfaces.

2. Description of the Related Art

Abrasive products, such as coated abrasives, bonded abrasives, and loose abrasives are used in various industries to machine work pieces, such as by lapping, grinding, or polishing. Surface processing using abrasive products spans a wide industrial scope from initial coarse material removal to high precision finishing and polishing of surfaces at a submicron level, also called superfinishing, micro-polishing, micro-finishing, and micromachining. Effective and efficient superfinishing of surfaces, particularly metal surfaces, poses numerous challenges.

Surface characteristics, such as surface roughness, can influence the performance and longevity of metal surfaces. For example, industrial mill rolls, crankshafts, cam shafts, engine components, and aircraft landing bearings rely on metal surfaces that have been precision polished to achieve proper performance and efficiency.

Industries that produce or rely on such highly smooth, highly polished hard surfaces are sensitive to factors that influence operational costs, including the speed at which a surface can be prepared, the cost of the materials used to prepare that surface, and the costs associated with the time expended to prepare a surface. Typically, industry seeks to achieve cost effective abrasive materials and processes that achieve high material removal rates. However, abrasives and abrasive processes that exhibit high removal rates often also tend to exhibit poor performance, if not impossibility, in achieving desired surface characteristics associated with high precision finishing and polishing of surfaces, such as at a submicron level. Conversely, abrasives that produce such desirable surface characteristics often have low material removal rates.

Therefore, the industry continues to demand further improved abrasive products and polishing methods that can offer enhanced processing performance, efficiency, and improved surface quality, particularly at a submicron level.

SUMMARY

In an embodiment, a coated abrasive product comprising a backing and an abrasive slurry comprising polymeric resin, abrasive aggregates, a crosslinking agent, a thixotropic agent, and organic solvent, wherein the abrasive aggregates are green, unfired and have a generally spheroidal or toroidal shape and are formed from a composition comprising abrasive grit particles and a nanoparticle binder, and wherein the abrasive slurry is applied to the backing. The abrasive slurry can further comprise a surfactant. The polymeric resin can be a polyester resin, an epoxy resin, or combinations thereof. The ratio of polyester resin to epoxy resin can range from about 1:4 to about 1:2.2. The ratio of green, unfired abrasive aggregate to polymeric resin can range from about 1.25:1 to about 2.25:1. The ratio of polymeric resin to crosslinking agent can range from about 9.5:1 to about 12.5:1. The abrasive slurry can comprise: about 11 wt % to about 44 wt % polymeric resin; about 20 wt % to about 50 wt % green, unfired abrasive aggregates; about 0.5 wt % to about 5.0 wt % of crosslinking agent; about 0.5 wt % to about 10 wt % of thixotropic agent; and the remainder be organic solvent. The abrasive slurry can further comprise about 0.5 to about 3.0 wt % of surfactant. The polymeric resin can comprise about 2.0 wt % to about 15 wt % of polyester resin and the remainder be epoxy resin. The thixotropic agent can comprise about 0.5 wt % to about 3.0 wt % of a first thixotrope and the remainder be a second thixotrope. The backing can be a polymeric film. The abrasive grit particles can be diamond.

In another embodiment, a coated abrasive product comprises a polymeric film backing, and a cured abrasive composition disposed on the backing comprising: polymeric resin; green, unfired abrasive aggregates having a generally spheroidal or toroidal shape, the aggregates formed from a composition comprising diamond abrasive grit particles and a nanoparticle binder; a crosslinking agent; and a thixotropic agent, wherein the ratio of green, unfired abrasive aggregate to polymeric resin ranges from about 1.25:1 to about 2.25:1 and the ratio of polymeric resin to crosslinking agent ranges from about 9.5:1 to about 12.5:1. The cured abrasive composition can comprise about 16 wt % to about 60 wt % polymeric resin, about 83 wt % to about 28 wt % green, unfired abrasive aggregates, about 0.5 wt % to about 4.0 wt % of crosslinking agent, and about 0.5 wt % to about 8.0 wt % of thixotropic agent. The cured abrasive composition can further comprise about 0.5 to about 3.0 wt % of surfactant. The polymeric resin can comprise about 4.0 wt % to about 25 wt % of polyester resin and the remainder be epoxy resin. The thixotropic agent can comprise about 0.5 wt % to about 3.0 wt % of a first thixotrope and the remainder be a second thixotrope.

In another embodiment, a coated abrasive product comprises: a backing; a binder composition disposed on the backing; and abrasive aggregates dispersed within the binder composition; wherein the binder composition comprises a polymeric mixture of polyester resin and epoxy resin present in a ratio of about 1:2 to about 1:3.5 by weight, respectively, and wherein the abrasive aggregates and binder composition are present in a ratio of about 1:1.5 to about 1:2 by weight, respectively, and wherein the abrasive aggregates are green, unfired and comprise diamond abrasive grit particles, and a nanoparticle binder, the nanoparticle binder having a continuous matrix phase in which the diamond grit particles are uniformly distributed, and wherein the coated abrasive product is capable of superfinishing a metal surface having an initial Ra of about 1.5 micro inches to about 12.5 micro inches to a final Ra of less than 1.0 micro inch. The polyester resin and epoxy resin can be present in a ratio of about 1:2.2 to about 1:3.3 by weight. The backing can be a polymeric film, such as a polyester film. The abrasive aggregates can have an average size ranging from about 25 micrometers to about 68 micrometers. The diamond abrasive grit particles can have an average particle size from about 6.0 micrometers to about 12 micrometers. The coated abrasive product can be capable of superfinishing the metal surface by applying the coated abrasive product to the surface two times or less, such as a single pass. The metal surface can have a Rockwell C hardness of about 20 to about 90. The metal surface can be tungsten carbide, chromium carbide, chromium oxide, chilled iron, forged steel, chrome plating, stainless steel, thermal spray ceramics, HVOF coatings, or combinations thereof.

Another embodiment is a method of superfinishing a surface comprising: polishing a surface with a single coated abrasive product that includes abrasive aggregates that are green, unfired and comprise diamond abrasive grit particles, and a nanoparticle binder, the nanoparticle binder having a continuous matrix phase in which the diamond grit particles are uniformly distributed, wherein the surface has an initial Ra in the range of about 1.5 micro inches to about 12.5 micro inches prior to polishing and after polishing has an Ra of less than 1.0 micro inch.

Another embodiment is a method of superfinishing a surface comprising: applying to a surface a single coated abrasive product that includes abrasive aggregates having diamond grit particles that are uniformly distributed within the abrasive aggregates and the abrasive aggregates are in contact with the surface; and moving at least the coated abrasive product or the surface relative to each other in a first abrading direction, while simultaneously moving at least the coated abrasive product or the surface relative to each other in a second abrading direction not parallel to the first abrading direction while still maintaining contact between the coated abrasive product and the surface, wherein the surface has an initial Ra in the range of about 1.5 micro inches to about 12.5 micro inches prior to application of the coated abrasive product and after application has an Ra of less than 1.0 micro inch, and wherein the single coated abrasive product is applied to the surface two times or less.

In another embodiment, a method of making a coated abrasive product comprises: mixing together polyester resin, epoxy resin, abrasive aggregates, a thixotropic agent, and a cross-linking agent to form an abrasive slurry; applying the abrasive slurry to a backing; and curing the abrasive slurry to form a coated abrasive product, wherein the polyester resin and epoxy resin are present in a ratio of about 1:2 to about 1:3 by weight, respectively, and wherein the abrasive aggregates and the total amount of resins are present in a ratio of about 1:1.5 to about 1:2 by weight, respectively, and wherein the abrasive aggregates are green, unfired and comprise diamond abrasive grit particles, and a nanoparticle binder, the nanoparticle binder having a continuous matrix phase in which the diamond grit particles are uniformly distributed.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "averaged," when referring to a value, is intended to mean an average, a geometric mean, or a median value.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 1:
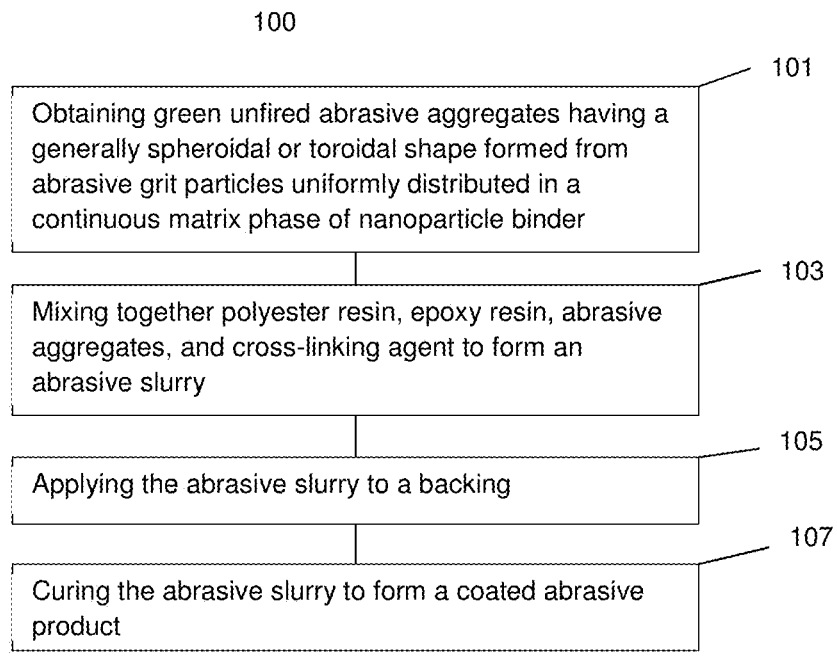
FIG. 1 is a process flow diagram of an embodiment of a method of forming an abrasive product.
Figure 2:
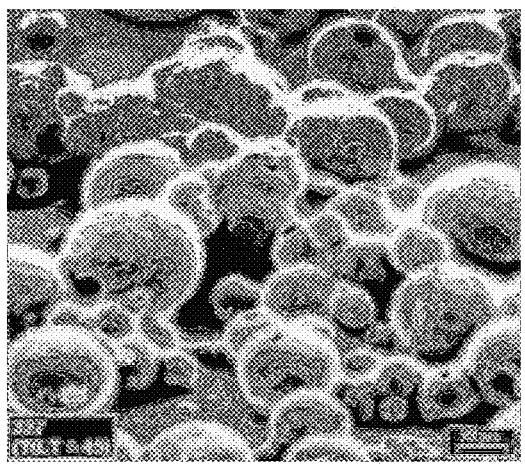
FIG. 2-4 are photomicrographs taken with a scanning electron microscope showing abrasive aggregates including diamond grit combined with silica nanoparticles in a coating on a backing.
Figure 3:
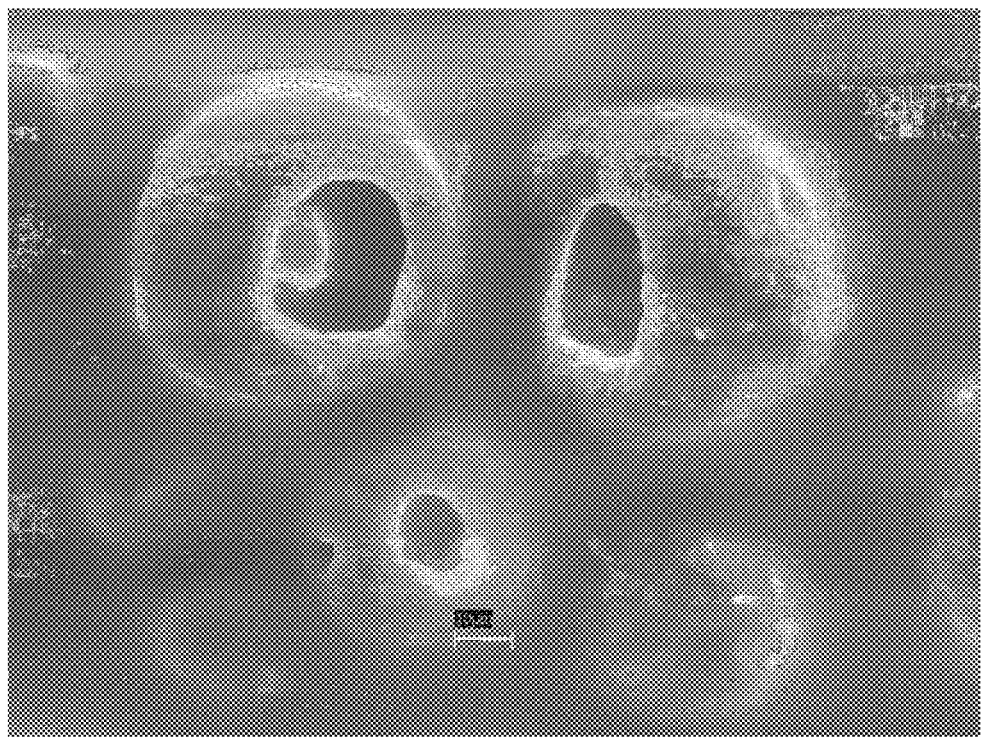
Figure 4:
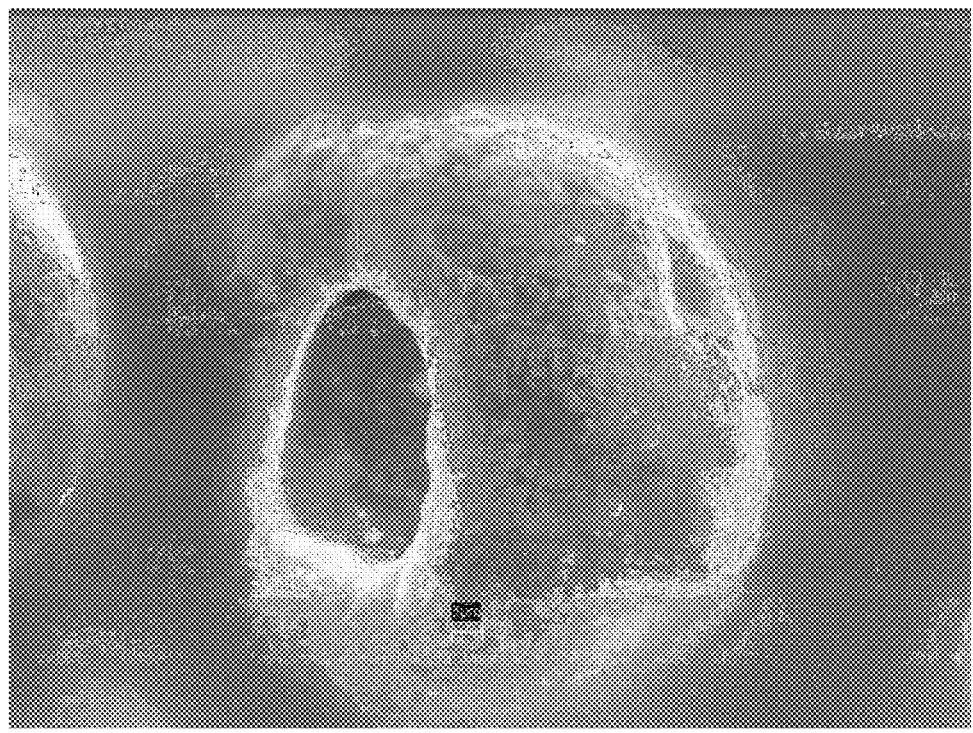
Figure 5:
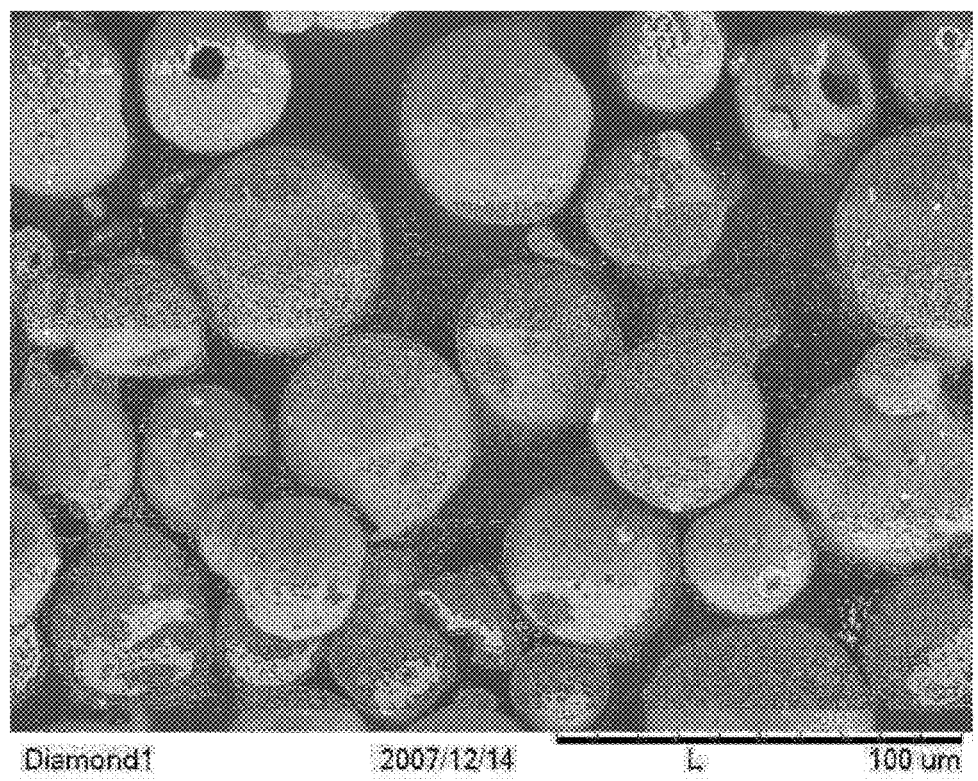
FIG. 5-6 are magnified images of abrasive aggregates that include diamond grit combined with silica nanoparticles.
Figure 6:
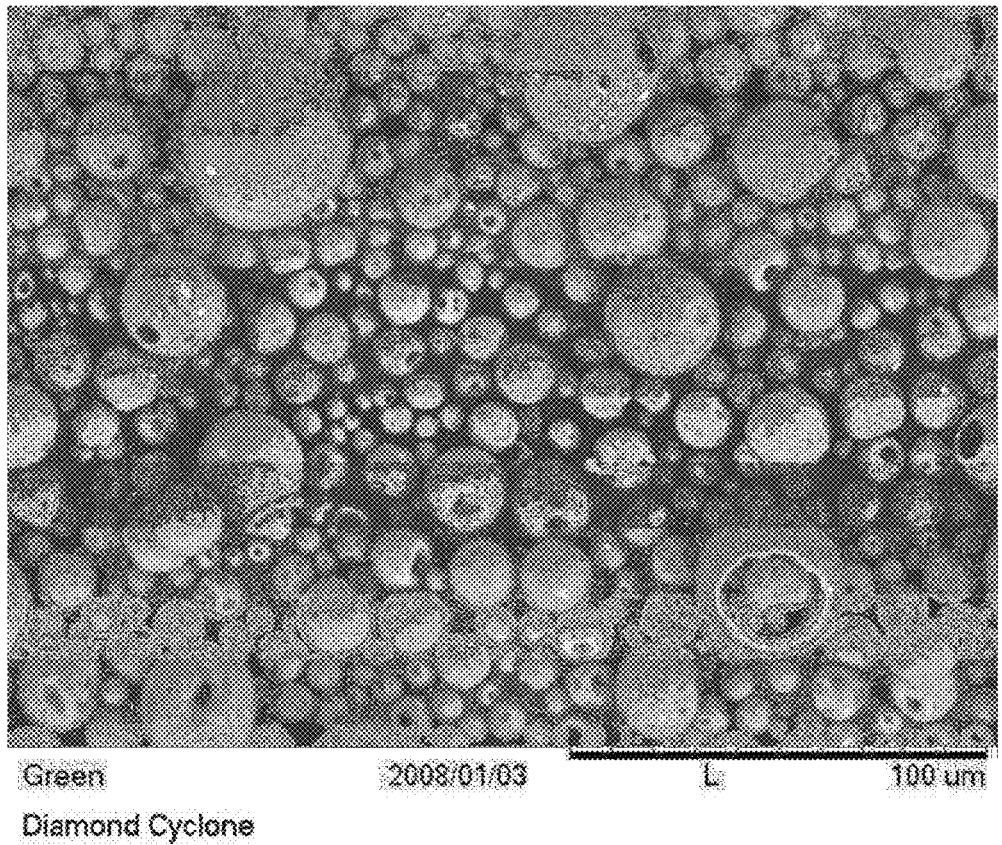

FIG. 1 shows a particular embodiment of a method 100 of making a coated abrasive product. The process is initiated at activity 101 by obtaining green, unfired abrasive aggregates having a generally spheroidal or toroidal shape, the abrasive aggregates being formed from a composition comprising abrasive grit particles and a nanoparticle binder, wherein the nanoparticle binder forms a continuous matrix phase in which the abrasive grit particles are uniformly distributed. In activity 103, mixing together of polyester resin, epoxy resin, abrasive aggregates, and a cross-linking agent occurs to form an abrasive slurry. In activity 105, applying the abrasive slurry to a backing occurs. Curing of the abrasive slurry occurs in activity 107 to form a coated abrasive product.

As used herein, the term "aggregate" may be used to refer to a particle made of a plurality of smaller particles that have been combined in such a manner that it is relatively difficult to separate or disintegrate the aggregate particle into smaller particles by the application of pressure or agitation. This is in contrast to the term "agglomerate," which is used herein to refer to a particle made up of a plurality of smaller particles that have been combined in such a manner that it is relatively easy to separate the agglomerate particle or disintegrate the agglomerate particle back into smaller particles, such as by the application of pressure or hand agitation.

Abrasive Aggregates

Suitable green, unfired abrasive aggregates include, for instance, those described in, and produced according to the methods of, U.S. patent application Ser. No. 12/018589 A1 to Starling, which has been recently allowed. The teachings of U.S. patent application Ser. No. 12/018589 A1 to Starling that are related to the making of green, unfired abrasive aggregates are hereby incorporated by reference for all purposes. Suitable abrasive aggregates are also available from Saint-Gobain Abrasives, Inc. under the brand name Nanozyte® and are exemplary of green, unfired abrasive aggregates. According to certain embodiments, the abrasive product includes green unfired abrasive aggregates having a composite structure, including both abrasive grits that have a size within the microparticle range, and a nanoparticle binder that provides the matrix of the abrasive aggregate in which the abrasive grits are embedded or contained.

Typically, the abrasive aggregates are utilized in the abrasive product without notable post-formation heat treatment, such as calcining, sintering, or recrystallization that would alter the crystallite size, grain size, density, tensile strength, young's modulus, and the like of the abrasive aggregates. Such heat treatment processes, though common, and which are generally carried out in excess of 400° C., generally 500° C. and above, easily ranging from 800° C. to 1200° C. and above for certain ceramic species, are not utilized herein.

The abrasive aggregates have a notable morphology, characterized by uniform distribution of the abrasive grits in the nanoparticle binder. Additionally, the abrasive aggregates have a generally spheroidal shape and are hollow, or a toroidal shape, the abrasive aggregates formed from a composition comprising abrasive grit particles and a nanoparticle binder. When viewed under magnification, as shown in the scanning electron micrographs of FIGS. 5-6, the abrasive aggregates have a generally spheroidal shape, being characterized as rounded or spherical. In some instances, however, the abrasive aggregates may be observed to have a void near the center of the abrasive aggregate and thus exhibit a more toroid-or torus-like shape as seen in the scanning electron micrographs of FIGS. 2-4. Individual particles of the abrasive grit material, such as diamond grit, may be observed to be dispersed over the surface of the abrasive aggregates and within the interior thereof, with relatively few instance of the individual grit particles clumping together on the surface of the abrasive aggregate. It is noted that FIGS. 2-6 show dispersed, individual abrasive aggregates that are bound together in a resin binder system.

The size and the size range of the abrasive aggregates may be adjusted and may depend on many factors, including the composition of the mixture and, if a spray dryer is used in the abrasive aggregate formation, the spray dryer feed rate. For example, abrasive aggregates of sizes including those of approximately 15 micrometers, 20 micrometers, 35 micrometers, 40 micrometers, 45 micrometers, 50 micrometers, 55 micrometers, 60 micrometers, 65 micrometers, and 70 micrometers have been successfully produced using a spray dryer. These abrasive aggregates can include abrasive grit particles ranging from about 5 to about 15 micrometers. In particular embodiments, the abrasive aggregate size ranges from about 20 micrometers to about 70 micrometers, about 30 micrometers to about 65 micrometers, or about 35 micrometers to about 60 micrometers. In another embodiment, the average abrasive aggregate size ranges from about 45 to about 55 micrometers, or about 50 micrometers.

Further study of the abrasive aggregates has revealed that certain spheroids are hollow, while others are essentially filled with grain and/or nanoparticle binder. Hollow particles can be analogized to thick-shelled racquet balls, having a wall thickness ($t_W$) within a range of about 0.08 to about 0.4 times the average particle size of the abrasive aggregates. Process parameters and compositional parameters can be modified to effect different wall thicknesses.

Once formed, the abrasive aggregates may, if desired, be classified and/or separated into various size ranges before being applied to a backing or otherwise utilized in a polishing operation. Classification of the abrasive aggregates can be accomplished by sieving, sorting, or gravimetric separation techniques. In an embodiment, the abrasive aggregates can be classified by being passed through a standard size mesh screen, such as for example a 90 micrometer mesh screen.

Abrasive Grit Particles

The abrasive grit particles that form the abrasive aggregates generally have a Mohs hardness of greater than about 3, and preferably from about 3 to about 10. For particular applications, the abrasive grit particles have a Mohs hardness not less than 8, 9, or 10. In an embodiment the abrasive grit particles have a Mohs hardness of 10. The abrasive grit particles are generally believed to serve as the primary active grinding or polishing agent in the abrasive aggregates. Examples of suitable abrasive compositions include non-metallic, inorganic solids such as carbides, oxides, nitrides and certain carbonaceous materials. Oxides include silicon oxide (such as quartz, cristobalite and glassy forms), cerium oxide, zirconium oxide, aluminum oxide. Carbides and nitrides include, but are not limited to, silicon carbide, aluminum, boron nitride (including cubic boron nitride), titanium carbide, titanium nitride, silicon nitride. Carbonaceous materials include diamond, which broadly includes synthetic diamond, diamond-like carbon, and related carbonaceous materials such as fullerite and aggregate diamond nanorods. Materials may also include a wide range of naturally occurring mined minerals, such as garnet, cristobalite, quartz, corundum, feldspar, by way of example. Certain embodiments of the present disclosure, take advantage of diamond, silicon carbide, aluminum oxide, and /or cerium oxide materials, with diamond being shown to be notably effective. In addition, those of skill will appreciate that various other compositions possessing the desired hardness characteristics may be used as abrasive grit particles in the abrasive aggregates of the present disclosure. In addition, in certain embodiments according to the present disclosure, mixtures of two or more different abrasive grit particles can be used in the same abrasive aggregates.

As should be understood from the foregoing description, a wide variety of abrasive grit particles may be utilized in embodiments. Of the foregoing, cubic boron nitride and diamond are considered "superabrasive" particles, and have found widespread commercial use for specialized machining operations, including highly critical polishing operations. Further, the abrasive grit particles may be treated so as to form a metallurgical coating on the individual particles prior to incorporation into the abrasive aggregates. The superabrasive grits are particularly suitable for coating. Typical metallurgical coatings include nickel, titanium, copper, silver and alloys and mixtures thereof.

In general, the size of the abrasive grit particles lies in the microparticle range. As used herein, the term "microparticle," may be used to refer to a particle having an average particle size of from about 0.1 microns to about 50 microns, preferably not less than about 0.2 microns, about 0.5 microns, or about 0.75 microns, and not greater than about 20 microns, such as not greater than about 10 microns. Particular embodiments have an average particle size from about 0.5 microns to about 10 microns. The size of the abrasive grit particles can vary upon the type of grit particles being used. For example, diamond grit particles can have the size of about 0.5 to about 10 microns, silicon carbide grit particles can have the size of about 3 to about 8 microns, and aluminum oxide grit particles can have a size of about 3 to about 5 microns.

It should be noted that the abrasive grit particles can be formed of abrasive aggregates of smaller particles such as abrasive aggregate nanoparticles, though more commonly the abrasive grits are formed of single particles within the microparticle range. As used herein, the term "nanoparticle," may be used to refer to a particle having an average particle size of from about 5 nm to about 150 nm, typically less than about 100 nm, 80 nm, 60 nm, 50 nm, or less than about 50 nm. For instance, a plurality of nano-sized diamond particles may be aggregated together to provide a microparticle of diamond grit. The size of the abrasive grit particles can vary depending upon the type of grit particles being used.

The abrasive grit particles may, in general, constitute between about 0.1% to about 85% of the abrasive aggregates. The abrasive aggregates more preferably include between about 10% to about 50% by weight of the abrasive grit particles.

The abrasive aggregates may be formed using a single size of abrasive grit particle, the size of the grit particle and the resultant abrasive aggregates both being tailored to the desired polishing application. In the alternative, mixtures of two or more differently sized abrasive grit particles may be used in combination to form abrasive aggregates having advantageous characteristics attributable to each of the grit particle sizes.

Nanoparticle Binder

The abrasive aggregates according to the present disclosure also include a nanoparticle binder material as stated above. The nanoparticle binder generally forms a continuous matrix phase that functions to form and hold the abrasive grit particles together within the abrasive aggregates in the nature of a binder. In this respect, it should be noted that the nanoparticle binder, while forming a continuous matrix phase, is itself generally made up of individually identifiable nanoparticles that are in intimate contact, interlocked and, to a certain extent, atomically bonded with each other. However, due to the green, unfired state of the thus formed abrasive aggregates, the individual nanoparticles are generally not fused together to form grains, as in the case of a sintered ceramic material. As used herein, description of nanoparticle binder extends to one or multiple species of binders.

The nanoparticle binder material may comprise very fine ceramic and carbonaceous particles such as nano-sized silicon dioxide in a liquid colloid or suspension (known as colloidal silica). Nanoparticle binder materials may also include, but are not limited to, colloidal alumina, nano-sized cerium oxide, nano-sized diamond, and mixtures thereof. Colloidal silica is preferred for use as the nanoparticle binder in certain embodiments of the present disclosure. For example, commercially available nanoparticle binders that have been used successfully include the colloidal silica solutions BINDZEL 2040 BINDZIL 2040 (available from Eka Chemicals Inc. of Marietta, Ga.) and NEXSIL 20 (available from Nyacol Nano Technologies, Inc. of Ashland, Mass.).

The abrasive aggregates also can advantageously include another material which serves primarily as a plasticizer, also known as a dispersant, to promote dispersion of the abrasive grit within the abrasive aggregates. Due to the low processing temperatures used, the plasticizer is believed to remain in the abrasive aggregates, and has been quantified as remaining by thermal gravimetric analysis (TGA). The plasticizer might also assist in holding together the grit particles and nanoparticle binder material in an abrasive aggregate when the mixture is spray dried.

Plasticizers include both organic and inorganic materials, including surfactants and other surface tension modifying species. Particular embodiments make use of organic species, such as polymers and monomers. In an exemplary embodiment, the plasticizer is a polyol. For example, the polyol may be a monomeric polyol or may be a polymeric polyol. An exemplary monomeric polyol includes 1,2-propanediol; 1,4-propanediol; ethylene glycol; glycerin; pentaerythritol; sugar alcohols such as malitol, sorbitol, isomalt, or any combination thereof; or any combination thereof. An exemplary polymeric polyol includes polyethylene glycol; polypropylene glycol; poly (tetramethylene ether) glycol; polyethylene oxide; polypropylene oxide; a reaction product of glycerin and propylene oxide, ethylene oxide, or a combination thereof; a reaction product of a diol and a dicarboxylic acid or its derivative; a natural oil polyol; or any combination thereof. In an example, the polyol may be a polyester polyol, such as a reaction products of a diol and a dicarboxylic acid or its derivative. In another example, the polyol is a polyether polyol, such as polyethylene glycol, polypropylene glycol, polyethylene oxide, polypropylene oxide, or a reaction product of glycerin and propylene oxide or ethylene oxide. In particular, the plasticizer includes polyethylene glycol (PEG).

Abrasive Slurry and Preparation

In an embodiment, the abrasive aggregates are preferably combined with a resin material, or resin mixture, that can be used to adhere the abrasive aggregates onto a surface of a backing. Processes for combining the abrasive aggregates with the resin bonding material include slurry formation, in which the abrasive aggregates, resin, and other additives are combined together until thoroughly mixed. In connection with slurry coating a backing, in addition to the abrasive aggregates, the slurry generally also includes a solvent such as water or an organic solvent and a polymeric resin material. The abrasive slurry may additionally comprise other ingredients, such as organic solvents, thixotropic agents, plasticizers, crosslinking agents, surfactants, chain transfer agents, stabilizers, dispersants, curing agents, reaction mediators, pigments, dyes, colorants, and fillers. In an embodiment, the slurry can include polymeric resin, abrasive aggregates, one or more organic solvents, one or more thixotropic agents, and one or more crosslinking agents. In another embodiment, the abrasive slurry may, optionally, include a surfactant.

All the slurry ingredients are thoroughly mixed together using, for example, a high shear mixer. Mixing can be conducted using high shear conditions, moderate shear conditions, low shear conditions, or combinations thereof. Typically, mixing occurs until the ingredients are thoroughly mixed.

In an embodiment, polyester resin, epoxy resin, and surfactant are mixed together to form a base mixture under low shear to moderate shear conditions. Abrasive aggregates are then added to the base mixture under high shear conditions. To complete the formation of the abrasive slurry, a thixotrope is then added to the base mixture under low shear conditions followed by the addition of a cross-linker, also under low shear conditions.

In an embodiment, the abrasive slurry has a composition that can include between about 11 wt % to about 44 wt % polymer resin, between about 20 wt % to about 50 wt % abrasive aggregates between about 0.5 wt % to about 5.0 wt % crosslinking agent, between about 0.5 wt % to about 10 wt % thixotropic agent with the remainder organic solvent, where the percentages are based on total weight of the abrasive slurry. Optionally, between about 0.5 wt % to about 3.0 wt of a surfactant can also be added to the abrasive slurry. If the surfactant is included, the amount of organic solvent can be adjusted so that the total amounts add up to 100 wt %.

The viscosity of the abrasive slurry can be monitored as it is being prepared. In an embodiment, the viscosity of the abrasive slurry is in a range of about 50 cps to about 200 cps prior to addition of the thixotropic agent and the crosslinking agent. After the addition of the thixotropic agent and the crosslinking agent, the abrasive slurry can have a viscosity in the range of about 210 to about 450 cps.

During mixing of the abrasive slurry ingredients, the ingredients may be added to the slurry one by one, in batches, or all at once. Typically the ingredients are added one by one to the abrasive slurry. If the ingredients are added one by one or in batches, the slurry can be agitated for a period of time until the ingredient has sufficiently mixed into the slurry. Typical agitation times range from about 1 minute to about 2 hours, depending on the ingredient or ingredients being added to the abrasive slurry.

In an embodiment, the abrasive slurry will have a ratio of green, unfired abrasive aggregate to polymeric resin in the range from about 1.25:1 to about 2.25:1, about 1.5:1 to about 2:1, about 1.65:1 to about 1.9:1. In another embodiment, the abrasive slurry will have a ratio of polymeric resin to crosslinking agent ranging from about 9.5:1 to about 12.5:1, about 10:1 to about 12:1.

Suitable Polymer Resins

Suitable polymeric resin materials include polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. A polymeric resin mixture may include more than one kind of a polymer resin from a class of polymer resins; for example, a polyester resin may be a mixture of copolyester resins. Preferably the polymeric resin comprises polyester resin, epoxy resin, or mixtures thereof. Most preferably, the resin is a mixture of polyester resin and epoxy resin. In an embodiment, the total amount of polymeric resin in the abrasive slurry can be not less than about 11 wt %, not less than about 12 wt %, not less than about 13 wt %, not less than about 14 wt %, or not less than about 15 wt %. In another embodiment, the amount of polymeric resin in the abrasive slurry can be not greater than about 44 wt %, not greater than about 42 wt %, not greater than about 40 wt %, or not greater than about 38 wt %. The amount of polymeric resin in the abrasive slurry can be within a range comprising any pair of the previous upper and lower limits. In a particular embodiment, the amount of polymeric resin included in the abrasive slurry can be in the range of not less than about 11 wt % to not greater than about 44 wt %.

Polyester Resin

Suitable polyester resins include linear, saturated copolyester resins that can be amorphous and highly-soluble in standard solvents, such as methyl ethyl ketone (2-butanone) (MEK), Toluol, ethyl acetate, and acetone. Alternatively, other suitable polyester resins can be semi-crystalline to crystalline products that have limited solubility and are applied with solvents such as 1, 3 Dioxolane or tetrahydrofuran (THF). In an embodiment the polyester resin can be a thermoplastic, high molecular weight, aromatic, linear saturated copolyester resin. For example, Vitel 2210 (Rohm and Haas Company, a wholly owned division of Dow Chemical, Philadelphia, Pa., USA), or SkybonES120 (SK Chemicals, South Korea or Worthen Industries, Nashua, N.H., USA). In an embodiment, the total amount of polyester resin in the abrasive slurry can be not less than about 2.0 wt %, not less than about 3.0 wt %, not less than about 4.0 wt %, or not less than about 5.0 wt %. In another embodiment, the amount of polyester resin in the abrasive slurry can be not greater than about 15 wt %, not greater than about 14 wt %, not greater than about 12 wt %, or not greater than about 10 wt %. The amount of polyester resin in the abrasive slurry can be within a range comprising any pair of the previous upper and lower limits. In a particular embodiment, the amount of polyester resin included in the abrasive slurry can be in the range of not less than about 2.0 wt % to not greater than about 15 wt %, or not less than about 2.0 wt % to not greater than about 10 wt %, or not less than about 2.5 wt % to not greater than about 8.0 wt %.

Epoxy Resin

An epoxy resin can include an aromatic epoxy or an aliphatic epoxy. Aromatic epoxies components include one or more epoxy groups and one or more aromatic rings. An example aromatic epoxy includes epoxy derived from a polyphenol, e.g., from bisphenols, such as bisphenol A (4,4'-isopropylidenediphenol), bisphenol F (bis[4-hydroxyphenyl]methane), bisphenol S (4,4'-sulfonyldiphenol), 4,4'-cyclohexylidenebisphenol, 4,4'-biphenol, 4,4'-(9-fluorenylidene)diphenol, or any combination thereof. The bisphenol can be alkoxylated (e.g., ethoxylated or propoxylated) or halogenated (e.g., brominated). Examples of bisphenol epoxies include bisphenol diglycidyl ethers, such as diglycidyl ether of Bisphenol A or Bisphenol F. A further example of an aromatic epoxy includes triphenylolmethane triglycidyl ether, 1,1,1-tris(p-hydroxyphenyl)ethane triglycidyl ether, or an aromatic epoxy derived from a monophenol, e.g., from resorcinol (for example, resorcin diglycidyl ether) or hydroquinone (for example, hydroquinone diglycidyl ether). Another example is nonylphenyl glycidyl ether. In addition, an example of an aromatic epoxy includes epoxy novolac, for example, phenol epoxy novolac and cresol epoxy novolac. Aliphatic epoxy components have one or more epoxy groups and are free of aromatic rings. The polymer precursor for the matrix polymer can include one or more aliphatic epoxies. An example of an aliphatic epoxy includes glycidyl ether of C2-C30 alkyl; 1,2 epoxy of C3-C30 alkyl; mono or multi glycidyl ether of an aliphatic alcohol or polyol such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols; or polyols. In one embodiment, the aliphatic epoxy includes one or more cycloaliphatic ring structures. For example, the aliphatic epoxy can have one or more cyclohexene oxide structures, for example, two cyclohexene oxide structures. An example of an aliphatic epoxy comprising a ring structure includes hydrogenated bisphenol A diglycidyl ether, hydrogenated bisphenol F diglycidyl ether, hydrogenated bisphenol S diglycidyl ether, bis(4-hydroxycyclohexyl)methane diglycidyl ether, 2,2-bis(4-hydroxycyclohexyl)propane diglycidyl ether, 3,4-epoxycyclohexylmethyl-3,4-epoxycyclohexanecarboxylate, 3,4-epoxy-6-methylcyclohexylmethyl-3,4-epoxy-6-methyl-cyclohexanecarboxylate, di(3,4-epoxycyclohexylmethyl)hexanedioate, di(3,4-epoxy-6-methylcyclohexylmethyl)hexanedioate, ethylenebis(3,4-epoxycyclohexanecarboxylate), ethanedioldi(3,4-epoxycyclohexylmethyl) ether, or 2-(3,4-epoxycyclohexyl-5,5-spiro-3,4-epoxy)cyclohexane-1,3-dioxane. In an embodiment the epoxy resin is a bisphenol A diglycidyl ether, low molecular weight solid epoxy resin derived from liquid epoxy resin and bisphenol-A. For example, Epon 1001F (Momentive Specialty Chemicals, Columbus, Ohio, USA). In an embodiment, the total amount of epoxy resin in the abrasive slurry can be not less than about 9.0 wt %, not less than about 10 wt %, not less than about 11 wt %, or not less than about 12 wt %. In another embodiment, the amount of epoxy resin in the abrasive slurry can be not greater than about 29 wt %, not greater than about 27 wt %, not greater than about 25 wt %, or not greater than about 23 wt %. The amount of epoxy resin in the abrasive slurry can be within a range comprising any pair of the previous upper and lower limits. In a particular embodiment, the amount of epoxy resin included in the abrasive slurry can be in the range of not less than about 9.0 wt % to not greater than about 29 wt %, not less than about 9.0 wt % to not greater than about 25 wt %, or not less than about 10 wt % to not greater than about 20 wt %.

Polymeric resins of the abrasive slurry can be partially dissolved with solvent (i.e., "diluted") to be more workable and have a particular percent solids range, or viscosity, depending on the application. In an embodiment, the polymeric resin of the abrasive slurry can have a percent solids between about 35 wt % and about 80 wt % based the combined polymeric resin and solvent. In another embodiment, the polyester resin can be diluted with organic solvent to have a solids content in the range of about 20 wt % to about 50 wt %. In another embodiment, the epoxy resin can be diluted with organic solvent to have a solids content in the range of about 40 wt % to about 80 wt %.

As previously discussed, suitable abrasive aggregates are those described in and produced according to the methods of U.S. patent application Ser. No. 12/018589 A1 to Starling. Preferred are abrasive aggregates available from Saint-Gobain Abrasives, Inc. under the brand name Nanozyte®. Particularly preferred are abrasive aggregates that contain diamond abrasive grit. In an embodiment, the amount of abrasive aggregate in the abrasive slurry can be not less than about 22 wt %, not less than about 24 wt %, not less than about 26 wt %, or not less than about 28 wt %. In another embodiment, the amount of abrasive aggregate in the abrasive slurry can be not greater than about 60 wt %, not greater than about 55 wt %, not greater than about 50 wt %, or not greater than about 45 wt %. The amount of abrasive aggregate in the abrasive slurry can be within a range comprising any pair of the previous upper and lower limits. In a particular embodiment, the amount of abrasive aggregate included in the abrasive slurry can be in the range of not less than about 22 wt % to not greater than about 50 wt %.

Suitable organic solvents are those which dissolve the resins of abrasive slurry, such as, for example, ketones, ethers, polar aprotic solvents, esters, aromatic solvents and aliphatic hydrocarbons, both linear and cyclic. Exemplary ketones include methyl ethyl ketone (2-butanone) (MEK), acetone and the like. Exemplary ethers include alkoxyalkyl ethers, such as methoxy methyl ether or ethyl ether, tetrahydrofuran, 1,4 dioxane and the like. Polar aprotic solvents include dimethyl formamide, dimethyl sulfoxide and the like. Suitable esters include alkyl acetates, such as ethyl acetate, methyl acetate and the like. Aromatic solvents include alkylaryl solvents, such as toluene, xylene and the like and halogenated aromatics such as chlorobenzene and the like. Hydrocarbon type solvents include, for example, hexane, cyclohexane and the like. A preferred organic solvent is methyl ethyl ketone. In an embodiment, the amount of organic solvent in the abrasive slurry can be not less than about 5.0 wt %, not less than about 6.0 wt %, not less than about 7.0 wt %, or not less than about 8.0 wt %. In another embodiment, the amount of organic solvent in the abrasive slurry can be not greater than about 68 wt %, not greater than about 67 wt %, not greater than about 66 wt %, not greater than about 65 wt %, or not greater than about 64 wt %. The amount of organic solvent in the abrasive slurry can be within a range comprising any pair of the previous upper and lower limits. In a particular embodiment, the amount of organic solvent included in the abrasive slurry can be in the range of not less than about 5.0 wt % to not greater than about 68 wt %.

Suitable surfactants are those that have a low solubility in water and that have amphipathic properties. In an embodiment, lecithin is a surfactant. In an embodiment, the amount of surfactant in the abrasive slurry can be not less than about 0.5 wt %, not less than about 0.6 wt %, or not less than about 0.7 wt %. In another embodiment, the amount of surfactant in the abrasive slurry can be not greater than about 3.0 wt %, not greater than about 2.75 wt %, not greater than about 2.5 wt %, or not greater than about 2.25 wt %. The amount of surfactant in the abrasive slurry can be within a range comprising any pair of the previous upper and lower limits. In a particular embodiment, the amount of surfactant included in the abrasive slurry can be in the range of not less than about 0.5 wt % to not greater than about 3.0 wt %.

Suitable thixotropic agents (i.e., thixotropes) are particulate materials such as such as synthetic silica or alumina. Additionally, more than one type of thixotropic agent or mixtures of thixotropic agents may be used in the abrasive slurry mixture. In an embodiment, the amount of thixotropic agent in the abrasive slurry can be not less than about 0.5 wt %, not less than about 0.6 wt %, or not less than about 0.7 wt %. In another embodiment, the amount of thixotropic agent in the abrasive slurry can be not greater than about 10 wt %, not greater than about 9 wt %, not greater than about 8 wt %, not greater than about 7 wt %, or not greater than about 6 wt %. The amount of thixotropic agent in the abrasive slurry can be within a range comprising any pair of the previous upper and lower limits. In a particular embodiment, the amount of thixotropic agent included in the abrasive slurry can be in the range of not less than about 0.5 wt % to not greater than about 10 wt %.

Suitable cross-linking agents are those that promote crosslinking of the polymeric resin materials in the abrasive slurry. Preferred, the crosslinking agent promotes crosslinking of polyester resin, or epoxy resin, or combinations thereof. Preferred cross-linking agents are isocyanates, including polyisocyanates. In an embodiment, the amount of cross-linking agent in the abrasive slurry can be not less than about 0.5 wt %, not less than about 0.75 wt %, or not less than about 1.0 wt %. In another embodiment, the amount of cross-linking agent in the abrasive slurry can be not greater than about 5.0 wt %, not greater than about 4.0 wt %, or not greater than about 3.0 wt %. The amount of cross-linking agent in the abrasive slurry can be within a range comprising any pair of the previous upper and lower limits. In a particular embodiment, the amount of cross-linking agent included in the abrasive slurry can be in the range of not less than about 0.5 wt % to not greater than about 5.0 wt %.

Applying the Abrasive Slurry to Backing

The abrasive slurry containing the abrasive aggregate grains is preferably applied to the backing using a blade spreader to form a coating. Alternatively, the slurry coating may be applied using slot die, smooth rolling, gravure, or reverse gravure coating methods. The coating thickness may range from about 1 to about 5 mils in thickness, after drying. As the backing is fed under the blade spreader at a desired coating speed, the abrasive slurry is applied to the backing in the desired thickness. The coat speed is preferably between about 10 to about 40 feet per minute.

Figure 8:
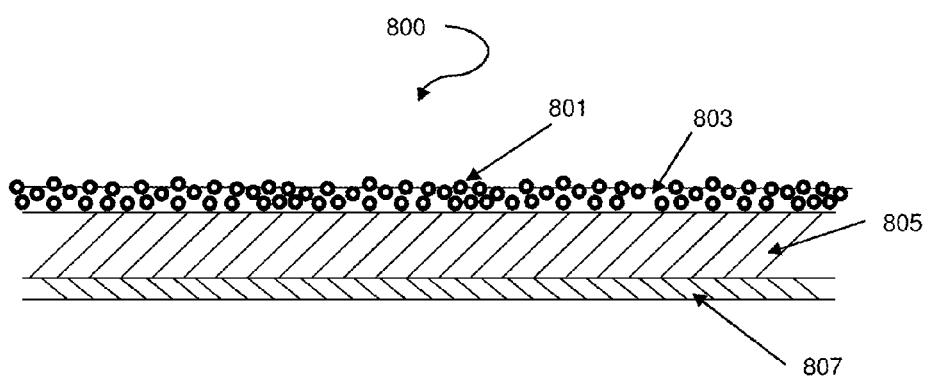
FIG. 8 is a drawing of an embodiment showing abrasive aggregates comprising diamond grit combined with silica nanoparticles coated onto a backing.

In an alternate embodiment, a resin mixture is first coated onto the backing, and the abrasive aggregates are placed onto the resin coated backing through electrostatic attraction (sometimes called "upcoating") or simply down through gravity (e.g., sprinkled onto the backing). Both approaches are well understood in the art, generally first depositing a 'make coat' on the backing, followed by abrasive aggregate application onto the make coat, and subsequent deposition of a 'size coat.' Optionally, a supersize coat may be deposited over the size coat. Further, a pliant coat may be disposed between the make coat and the backing. In another example, a back coat may be disposed over the backing on a side opposite the make coat. FIG. 8 shows an embodiment of an abrasive product 800 comprising abrasive aggregates 801 dispersed in a resin composition 803 (a make coat) that is disposed on a backing 805, which also has an optional back coat 807.

Curing the Abrasive Slurry

The coated backing is then heated in order to cure the resin and bond the abrasive aggregate grains to the backing. The resin can be at least partially cured or fully cured. Additional molding or forming of the partially cured coating can be performed prior to full curing. In general, the coated backing is heated to a temperature of between about 100° C. to less than about 250° C. during the curing process. In certain embodiments of the present disclosure, it is preferred that the curing step be carried at a temperature of less than about 200° C.

Once the resin is fully cured, the abrasive aggregates are bonded to the backing and the coated backing may be used for a variety of stock removal, finishing, and polishing applications.

In an embodiment the cured abrasive coating has a composition that can include between about 16 wt % to about 60 wt % polymer resin, between about 83 wt % to about 28 wt % abrasive aggregates between about 0.5 wt % to about 4.0 wt % crosslinking agent, and between about 0.5 wt % to about 8.0 wt % thixotropic agent, wherein the percentages are based on total weight of the cured abrasive coating. Optionally, between about 0.5 wt % to about 3.0 wt of a surfactant can also be included in the cured abrasive coating. If the surfactant is included, the amount of abrasive aggregate can be adjusted so that the total amounts add up to 100 wt %.

In an embodiment, the total amount of polymeric resin in the cured abrasive coating can be not less than about 16 wt %, not less than about 18 wt %, not less than about 20 wt %, not less than about 22 wt %, or not less than about 24 wt %. In another embodiment, the amount of polymeric resin in the cured abrasive coating can be not greater than about 60 wt %, not greater than about 58 wt %, not greater than about 56 wt %, not greater than about 54 wt %, or not greater than about 52 wt %. The amount of polymeric resin in the cured abrasive coating can be within a range comprising any pair of the previous upper and lower limits. In a particular embodiment, the amount of polymeric resin included in the cured abrasive coating can be in the range of not less than about 16 wt % to not greater than about 60 wt %, not less than about 20 wt % to not greater than about 55 wt %, or not less than about 22 wt % to not greater than about 44 wt %.

In an embodiment, the amount of polyester resin in the cured abrasive coating can be not less than about 3.0 wt %, not less than about 4.0 wt %, not less than about 5.0 wt %, not less than about 6.0 wt %, or not less than about 7.0 wt %. In another embodiment, the amount of polyester resin in the cured abrasive coating can be not greater than about 25 wt %, not greater than about 23 wt %, not greater than about 21 wt %, not greater than about 19 wt %, or not greater than about 17 wt %. The amount of polyester resin in the cured abrasive coating can be within a range comprising any pair of the previous upper and lower limits. In a particular embodiment, the amount of polyester resin included in the cured abrasive coating can be in the range of not less than about 3.0 wt % to not greater than about 25 wt %, not less than about 4.0 wt % to not greater than about 20 wt %, or not less than about 5.0 wt % to not greater than about 15 wt %.

In an embodiment, the amount of epoxy resin in the cured abrasive coating can be not less than about 12 wt %, not less than about 13 wt %, not less than about 14 wt %, not less than about 15 wt %, not less than about 16 wt %, not less than about 17 wt %, not less than about 18 wt %, or not less than about 19 wt %. In another embodiment, the amount of epoxy resin in the cured abrasive coating can be not greater than about 35 wt %, not greater than about 32 wt %, not greater than about 33 wt %, not greater than about 32 wt %, not greater than about 31 wt %, not greater than about 30 wt %, or not greater than about 29 wt %. The amount of epoxy resin in the cured abrasive coating can be within a range comprising any pair of the previous upper and lower limits. In a particular embodiment, the amount of epoxy resin included in the cured abrasive coating can be in the range of not less than about 12 wt % to not greater than about 35 wt %, not less than about 14 wt % to not greater than about 33 wt %, or not less than about 17 wt % to not greater than about 29 wt %.

In an embodiment, the amount of abrasive aggregate in the cured abrasive coating can be not less than about 25 wt %, not less than about 28 wt %, not less than about 30 wt %, not less than about 35 wt %, or not less than about 45 wt %. In another embodiment, the amount of abrasive aggregate resin in the cured abrasive coating can be not greater than about 85 wt %, not greater than about 83 wt %, not greater than about 80 wt %, not greater than about 77 wt %, or not greater than about 75 wt %. The amount of abrasive aggregate resin in the cured abrasive coating can be within a range comprising any pair of the previous upper and lower limits. In a particular embodiment, the amount of abrasive aggregate resin included in the cured abrasive coating can be in the range of not less than about 25 wt % to not greater than about 83 wt %, not less than about 28 wt % to not greater than about 80 wt %, not less than about 35 wt % to not greater than about 79 wt %, not less than about 40 wt % to not greater than about 78 wt %, not less than about 44 wt % to not greater than about 77 wt %.

In an embodiment, the amount of thixotropic agent in the cured abrasive coating can be not less than about 0.5 wt %, not less than about 0.6 wt %, not less than about 0.7 wt %, not less than about 0.8 wt %, or not less than about 0.9 wt %. In another embodiment, the amount of thixotropic agent resin in the cured abrasive coating can be not greater than about 8.0 wt %, not greater than about 7.0 wt %, not greater than about 6.0 wt %, not greater than about 5.0 wt %, or not greater than about 4.0 wt %. The amount of thixotropic agent resin in the cured abrasive coating can be within a range comprising any pair of the previous upper and lower limits. In a particular embodiment, the amount of thixotropic agent resin included in the cured abrasive coating can be in the range of not less than about 0.5 wt % to not greater than about 8.0 wt %.

In an embodiment, the amount of cross-linking agent in the cured abrasive coating can be not less than about 0.5 wt %, not less than about 0.6 wt %, not less than about 0.7 wt %, not less than about 0.8 wt %, or not less than about 0.9 wt %. In another embodiment, the amount of cross-linking agent resin in the cured abrasive coating can be not greater than about 4.0 wt %, not greater than about 3.9 wt %, not greater than about 3.8 wt %, not greater than about 3.7 wt %, or not greater than about 3.6 wt %. The amount of cross-linking agent resin in the cured abrasive coating can be within a range comprising any pair of the previous upper and lower limits. In a particular embodiment, the amount of cross-linking agent resin included in the cured abrasive coating can be in the range of not less than about 0.5 wt % to not greater than about 4.0 wt %.

Backing

The cured abrasive coated backing may them be used as a lapping film or a micro-finishing film for finishing and/or polishing other materials. Backing materials which may be coated in this manner include, but are not limited to, any flexible web, including polymeric film, paper, cloth, metallic film, vulcanized fiber, non-woven substrates, and any combinations of the foregoing, and treated versions of the foregoing materials. The backing preferably comprises a polymeric film, such as a film of polyester, polyurethane, polypropylene, polyimides such as KAPTON from DuPont. Polyester films are particularly preferred as the backing material in certain embodiments of the present disclosure. The film preferably can be primed to promote adhesion of the abrasive aggregates to the backing. Suitable backings may have a thickness, before being coated, of from about 1 to about 14 mils. The backing can be laminated to another substrate for strength, support, or dimensional stability. Lamination can be accomplished before or after the abrasive article is formed. The abrasive article can be in the form of an endless belt, a disk, a sheet, or a flexible tape that is sized so as to be capable of being brought into contact with a workpiece. The abrasive aggregates can be disposed on one or both major surfaces of the backing.

Figure 7:
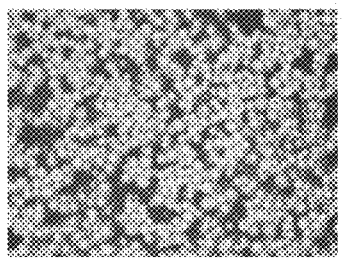
FIG. 7 is a is a magnified top view image of an embodiment that includes abrasive aggregates comprising diamond grit combined with silica nanoparticles that are coated onto a clear film backing.

FIG. 7 shows a magnified photograph of an embodiment of a coated abrasive product comprising abrasive aggregates dispersed in a polymer resin coating on a transparent polymer film backing.

Superfinishing of Surfaces

The abrasive product can be used for stock removal, finishing, and polishing of metal surfaces such as tungsten carbide, chromium carbide, chromium oxide, chilled iron, forged steel, chrome plating, stainless steel, thermal spray ceramics, HVOF coatings, or combinations thereof. As used herein, the term "metal" can refer to a single metal or a metal alloy, i.e., a blend of at least two metals. Metals also includes metal oxides, metal nitrides, metal carbides, and mixtures thereof, and further specifically includes high velocity oxygen fuel (HVOF) thermal spray coatings. In a particular embodiment, the abrasive product can be used to finish or polish metals having a Rockwell C hardness of at least about 20, about 30, about 40, or about 50. In another embodiment the abrasive product can be used to finish or polish metals having a Rockwell C hardness of not greater than about 90, about 85, about 80, or about 75. The Rockwell C hardness of the surface to be finished or polished with the abrasive product can be within a range comprising any pair of the previous upper and lower limits. In a particular embodiment, the abrasive product can be used to finish or polish metals having a Rockwell C hardness in the range of about 20 to about 90, about 30 to about 85, about 40 to about 85, or about 50 to about 82.

When used for polishing metal surfaces, the abrasive products are preferably produced including abrasive aggregates formed from diamond grit combined with a silica nanoparticle binder. The grit particles preferably have a size of in the range of about 6 micrometers to about 12 micrometers, with an average size of about 9 micrometers. The overall size of the abrasive aggregates is preferably from about 30 micrometers to about 90 micrometers. These abrasive aggregates are preferably bonded to polyester polymeric film backing. Using the abrasive product, polishing of the surfaces may be carried out, for example, using metal polishing machines such as those available from Struers, Inc. of Westlake, Ohio), Grinding Equipment & Machinery Company, LLC. ("GEM") (Youngstown, Ohio, USA), Loeser-USA Inc. (Brighton, Mich., USA), Supfina Machine Company, Inc. (North Kingstown, R.I., USA), and Dynabrade Inc. (Clarence, N.Y., USA).

Such metal polishing machines are known in the art and typically take advantage of embodiments of the abrasive product in the form of endless belts or polymeric films. The metal polishing machines are particularly suited to the polishing of cylindrical workpieces, such as industrial mill rolls, crankshafts, cam shafts, engine components, precision auto parts, and aircraft landing bearings. The metal polishing machines may vary somewhat as to particulars, but all function by bringing the abrasive aggregates contained in polymer resin coating into contact with the surface of the workpiece to be polished. During the polishing process, the polishing machines usually perform some variation of moving at least the coated abrasive product or the surface relative to each other in a first abrading direction, while simultaneously moving at least the coated abrasive product or the surface relative to each other in a second abrading direction not parallel to the first abrading direction while still maintaining contact between the coated abrasive product and the surface. For an abrasive product in the form of an endless belt, the belt is typically mounted over a contact wheel and idler wheel. The contact wheel provides a means of a support for the abrasive product during the polishing process. For a disc, the disc is secured to a support pad by a mechanical fastener or an adhesive. For an abrasive product in the form of a tape (i.e., a two-ended ribbon of the abrasive product), the fresh or unused portion of abrasive product is generally unwound from a supply roll and the used or worn portion of the abrasive product is generally wound onto a take-up roll. The tape, the supply roll, and the take-up roll can be housed in a cartridge or cassette. The supply roll is typically frictionally retained in the cartridge or cassette so as to not rotate freely so that tension can be maintained to provide consistent feeding and tracking. The rate the tape is fed can be precisely controlled by known techniques to optimize the surface finish. For example, the take-up roll can be driven by a variable speed D.C. take-up motor. With such drive means, the abrasive product can be continuously fed through an interface formed by the merger of the abrasive product and the workpiece surface at a rate of from about 0.25 to about 150 inches/minute, preferably from about 0.25 to about 12 inches/minute. The abrasive product can also be held stationary and then can be periodically indexed as desired. As used herein, the term "index" means to move a machine or a piece of work held in a machine tool so that a specific operation will be repeated at definite intervals of space. The abrasive product is pressed against the workpiece by means of a support roll or support shoe. The support shoe can be a platen, roller, deadhead, or any other device that provides the desired pressure between the abrasive product and workpiece at their interface. Pressure can be maintained through the use of hydraulic fluids, air pressure, springs, electrically driven components, etc. The contact force of the abrasive product on the surface of the workpiece generated by the support shoe can be precisely controlled, if desired, by known techniques.

State-of-art conventional finishing processes, including superfinishing of surfaces are typically accomplished by a multi-step, incremental process. The surface is first polished with a relatively coarse abrasive material and then polished again with a somewhat finer grit abrasive material. This process is usually repeated several times, with each successive polishing being carried out with a progressively finer grit abrasive until the surface is polished to the desired degree of smoothness. This type of multi-step polishing procedure has conventionally been required because it is generally understood that the grains of an abrasive must be on the same scale as the size of the scratches which are to be removed.

In contrast to the conventional multi-step procedure, however, it has been quite surprisingly and unexpectedly observed that metal surfaces can be polished, including superfinishing of a surface down to a surface roughness of less than a micro inch, using a reduced number of polishing steps, sometimes even in only a single step, as well as, using only a single abrasive product, rather than multiple different abrasive products. This result is quite surprising and highly advantageous. It is been observed that when abrasive products according to the present disclosure are used, the entire polishing can be accomplished using only one abrasive product. This results in a considerable reduction in the time needed to achieve a desired degree of polishing smoothness, as well as marked reduction in costs due to time saved by not having to switch out successive different abrasive products, as well as not needing to use the multiple abrasive products. Without being bound by theory, it is believed that the advantage may be derived, at least in part, from the unique properties of the green, unfired abrasive aggregates in combination with the composition of the polymer resin coatings of the present disclosure.

Various surface roughness parameters are known in the art and used to describe the surface quality. The arithmetical mean ("average") roughness, or Ra, of a surface is a measure of the degree of variations in the overall height profile of a surface over a given standard length. Root mean square roughness, Rq, also called Rrms, is a measure of the root mean square of the roughness over a given standard length. Maximum peak, or maximum height, Ry, measures the maximum distance between the highest peak and the lowest valley along a standard length. Ten-point mean roughness, Rz, is a measure of the average of the five highest peaks and the five lowest valleys. Lower Ra, Rq, Ry, and Rz values are generally indicative of a surface that is smoother and has smaller variations in its overall height between differing locations on the surface (i.e., it has a generally smoother surface profile).

Based upon testing of numerous embodiments, it has been found that initial surface roughness of a work piece can be machined and polished, sometimes even superfinished in a single step, using a single abrasive product, something well beyond the capability of a conventional single abrasive product. For example, for a workpiece having an initial average surface roughness $Ra_i$ embodiments herein have shown the capability of reducing the initial average surface roughness $Ra_i$ to a final average surface roughness as a result of abrading the workpiece, the final average surface roughness $Ra_f$ being not greater than 0.2 $Ra_i$, such as not greater than 0.1 $Ra_i$. The foregoing achievement in the reduction of average surface roughness by using a single product bears notable attention, as state of the art abrasive products are generally quite limited in average surface roughness reduction utilizing a single product. Indeed, average surface roughness reductions have been measured to values not greater than 0.5 $Ra_i$, and even not greater than about 0.01 $Ra_i$, representing a notable 2 order of magnitude reduction in average surface roughness Ra. In another embodiment, a final average surface roughness of less than 1.0 micro inches can be achieved on metal surfaces, even when the initial average surface roughness is at least about 1.5 micro inches, at least about 2.0 micro inches, at least about 2.5 micro inches, at least about 3.0 micro inches, or at least about 3.5 micro inches. In another embodiment, a final average surface roughness of less than 1.0 micro inches can be achieved on metal surfaces, even when the average initial surface roughness is not greater than about 12.5, not greater than about 11 micro inches, not greater than about 10.5 micro inches, not greater than about 10 micro inches, not greater than about 9.0 micro inches, not greater than about 8.5 micro inches, not greater than about 8.0 micro inches, not greater than about 7.5 micro inches, not greater than about 7.0 micro inches, not greater than about 6.5, not greater than about 6.0 micro inches, not greater than about 5.5 micro inches, not greater than about 5.0 micro inches, not greater than about 4.5 micro inches. A final average surface roughness of less than 1.0 micro inches can be achieved on metal surfaces, even when the average initial surface roughness micro inches in a range of about 1.5 micro inches to about 12.5 micro inches, of about 2.0 micro inches to about 10.5 micro inches, of about 2.1 micro inches to about 9.5 micro inches, or of about 2.2 micro inches to about 8.5 micro inches. The range of average initial surface roughness may be within a range comprising any one of the previous upper or lower limits.

The properties and advantage of the present disclosure are illustrated in further detail in the following nonlimiting examples. Unless otherwise indicated, temperatures are expressed in degrees Celsius, pressure is ambient, and concentrations are expressed in weight percentages.

Components Listing

Vitel 2210 (diluted 40% MEK)—thermoplastic, high molecular weight, aromatic, linear saturated copolyester resin (Rohm and Haas Company, a wholly owned division of Dow Chemical, Philadelphia, Pa., USA).

Epon 1001F (diluted 60% MEK)—bisphenol A diglycidyl ether, low molecular weight solid epoxy resin derived from liquid epoxy resin and bisphenol-A (Momentive Specialty Chemicals, Columbus, Ohio, USA).

Methyl Ethyl Ketone (MEK)—commonly commercially available, reagent grade.

Yelkins TS-Soya lecithin (Archer Daniels Midland Company, Decatur, Ill., USA).

Dia 9 Nanozyte—green, unfired abrasive aggregates comprising diamond grit having an average size of 9 µm that is dispersed in nanoparticle colloidal silica (Saint-Gobain Abrasives, Inc., Worcester, Mass.).

Burgess 98—thixotropic agent, hydrous aluminum silicate (Burgess Pigment Company, Sandersville, Ga., USA).

BYK-410—thixotropic agent solution of modified urea (BYK USA Inc., Wallingford, Conn.).

Coreactant F—isocyanate crosslinking agent (Rohm and Haas Company, a wholly owned division of Dow Chemical, Philadelphia, Pa.).

Bindzil 2040—colloidal silica solution (available from Eka Chemicals Inc. of Marietta, Ga.)

PEG 200—polyethylene glycol

EXAMPLE 1

Making of Coated Abrasive Product

A. Abrasive Aggregate

Green, unfired abrasive aggregate (Nanozyte 9 micrometer Diamond from Saint-Gobain Abrasives, Waltham Mass.) was obtained that made according to the teachings and methods of U.S. patent application Ser. No. 12/018589 A1 to Starling. The abrasive aggregates were sieved though a 90 mesh screen and had an average abrasive aggregate particle size between 35 to 60 micrometers. The abrasive aggregate composition is provided in the table below.

TABLE 1

Abrasive Aggregates Composition

| Component | Wt % in mixture |
|---|---|
| Diamond grit | 49.8 |
| BINDZIL 2040 silica sol | 41.8 |
| PEG 200 | 2.5 |
| Deionized water | 5.8 |
| Total | 99.9 |

Diamond grit particle size range 6-12 micrometers, average particle size of 9 micrometers, available from Warren/Amplex Superabrasives (Olyphant, Pa.).

B. Abrasive Slurry Preparation

An abrasive slurry composition was made by mixing together the following components listed in the table below.

TABLE 2

Abrasive Slurry Composition

| Component | Wt % in mixture |
|---|---|
| Vitel 2210 @ 42% in MEK | 12.89 |
| MEK | 23.71 |
| Yelkins TS | 0.98 |
| Dia 9 Nanozyte | 34.34 |
| Epon 1001F @ 60% in MEK | 23.71 |
| BYK-410 | 0.73 |
| Burgess 98 | 1.92 |
| Coreactant F | 1.72 |
| Total | 100.0 |

Diluted Vitel 2210 (42% solids), diluted Epon 1001F (60% solids), MEK, and Yelkins TS were mixed together in a high shear mixer until thoroughly mixed. The mixture was again agitated under high shear and the Dia 9 Nanozyte abrasive aggregates were added until thoroughly mixed in. The BYK-410 was added to the mixture under low shear until thoroughly mixed. The mixture was again agitated under low shear and the Coreactant F was added. The mixture was allowed to stand for approximately 45 minutes and then agitated lightly. The abrasive slurry composition had a viscosity in the range of about 200 to 400 cps.

C. Abrasive Film Preparation

The abrasive slurry composition was applied to a 3 mil polyethylene terephthalate (PET) polymeric film. The abrasive slurry coated film was cured by oven at a temperature in the range of about 150° C. to 205° C. Upon exiting the oven, the abrasive resin coating composition was substantially complete and the abrasive aggregates were substantially bonded to the film.

EXAMPLE 2

Forged Steel Roll Polishing—GEM System

A GEM metal polishing machine, model 08150-G, was used to compare the superfinishing performance of an inventive diamond abrasive film prepared as in Example 1 to a state-of-the-art conventional polishing method that uses multiple diamond abrasive films. The workpiece being polished was a 4.0 ft. diameter forged steel roll. The GEM machine was set for an infeed of 1"/minute and a traverse of 1.9"/min. The results of the comparative testing are presented in the table below.

TABLE 3

Roll Polishing - Forged Steel Roll - 4 ft Roll - GEM Machine

| Pass | Comparative Film | Ra | Rz | Pass | Inventive Film | Ra | Rz |
|---|---|---|---|---|---|---|---|
| 0 | Starting Condition | 2.99 | 28 | 0 | Starting Condition | 4.31 | 35 |
| 1 | Diamond 45 μm | 2.25 | 20 | 1 | Diamond 9 μm | 0.66 | 7.2 |
| 2 | Diamond 30 μm | 2.07 | 24 | 2 | Diamond 9 μm | 0.68 | 5 |
| 3 | Diamond 30 μm | 2.08 | 18 | | | | |
| 4 | Diamond 15 μm | 1.16 | 11 | | | | |
| 5 | Diamond 15 μm | 1.02 | 12 | | | | |
| 6 | Diamond 9 μm | 0.91 | 8.1 | | | | |
| 7 | Diamond 9 μm | 0.9 | 6.2 | | | | |

As shown in the table above, to achieve a final average surface roughness Ra of less than 1.0 micro inch required the use of four different conventional diamond abrasive films, seven total passes, and a total polishing time of approximately 300 minutes. In contrast, diamond abrasive aggregate films according to the present disclosure required only a single film, two total passes, and a total polishing time of approximately 100 minutes. Further, it can be seen that the inventive film was able to achieve lower Ra and Rz values than the comparative films, thus indicating a superior surface smoothness was achieved.

EXAMPLE 3

Tungsten Carbide Roll Polishing—Dynabrade System

A Dynabrade metal polishing machine, model 64000, was used to compare the superfinishing performance of an inventive diamond abrasive film prepared as in Example 1 to a state-of-the-art conventional polishing method that uses multiple diamond abrasive films. The workpiece being polished was a 4.0 inch diameter tungsten carbide alloy roll. The Dynabrade machine settings were the same for both the comparative abrasive films and the inventive films. The results of the comparative testing are presented in the table below.

TABLE 4

Roll Polishing - Forged Steel Roll - 4 ft Roll - GEM Machine

| Pass | Comparative Film | Ra | Ry | Rz | Rq | Pass | Inventive Film | Ra | Ry | Rz | Rq |
|---|---|---|---|---|---|---|---|---|---|---|---|
| 0 | Starting Condition | 5.6 | 48.7 | 40.1 | 7.1 | 0 | Starting Condition | 4.5 | 41.1 | 33.2 | 5.7 |
| 1 | Diamond 30 μm | 1.1 | 11.3 | 8.1 | 1.4 | 1 | Diamond 9 μm | 2.1 | 22.3 | 15.1 | 3.0 |
| 2 | Diamond 15 μm | 1.3 | 12.9 | 8.1 | 1.7 | 2 | Diamond 9 μm | 0.9 | 9.8 | 6.1 | 1.2 |
| 3 | Diamond 9 μm | 0.9 | 10.2 | 8.1 | 1.2 | | | | | | |

As shown in the table above, to achieve a final average surface roughness Ra of less than 1.0 micro inch required the use of three different conventional diamond abrasive films, three total passes, and a total polishing time of approximately 10 minutes. In contrast, diamond abrasive aggregate films according to the present disclosure required only a single film, two total passes, and a total polishing time of approximately 4 minutes. Further, it can be seen that the inventive film was able to achieve Ra and Rq values equal to the comparative films, but lower Ry and Rz values, thus indicating a superior surface smoothness was achieved.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A coated abrasive product comprising:
    a backing; and
    an abrasive composition,
    wherein the abrasive composition comprises
        polymeric resin,
        abrasive aggregates,
        a crosslinking agent,
        a thixotropic agent, and
    wherein the abrasive aggregates are green, unfired and have a generally spheroidal or toroidal shape and are formed from a composition comprising abrasive grit particles and a nanoparticle binder, and
    wherein the abrasive composition is applied to the backing, and
    wherein the ration of polymeric resin to crosslinking agent ranges from about 9.5:1 to about 12.5:1.

2. The coated abrasive product of claim 1, wherein the polymeric resin is a polyester resin, an epoxy resin, or combinations thereof.

3. The coated abrasive product of claim 2, wherein the polymeric resin is a combination of polyester resin and epoxy resin.

4. The coated abrasive product of claim 3, wherein the ratio of polyester resin to epoxy resin ranges from about 1:4 to about 1:2.2.

5. The coated abrasive product of claim 1, wherein the ratio of green, unfired abrasive aggregate to polymeric resin ranges from about 1.25:1 to about 2.25:1.

6. The coated abrasive product of claim 1, wherein the abrasive composition comprises
    about 11 wt % to about 44 wt % polymeric resin,
    about 20 wt % to about 50 wt % green, unfired abrasive aggregates,
    about 0.5 wt % to about 5.0 wt % of crosslinking agent, and
    about 0.5 wt % to about 10 wt % of thixotropic agent.

7. The coated abrasive product of claim 6, wherein the abrasive slurry further comprises about 0.5 to about 3.0 wt % of surfactant.

8. The coated abrasive product of claim 6, wherein the polymeric resin comprises about 2.0 wt % to about 15 wt % of polyester resin and the remainder is epoxy resin.

9. The coated abrasive product of claim 6, wherein the thixotropic agent comprises about 0.5 wt % to about 3.0 wt % of a first thixotrope and the remainder is a second thixotrope.

10. A coated abrasive product comprising
    a polymeric film backing, and
    a cured abrasive composition disposed on the backing comprising:
        polymeric resin;
        green, unfired abrasive aggregates having a generally spheroidal or toroidal shape, the aggregates formed from a composition comprising diamond abrasive grit particles and a nanoparticle binder;
        a crosslinking agent; and
        a thixotropic agent;
    wherein the ratio of green, unfired abrasive aggregate to polymeric resin ranges from about 1.25:1 to about 2.25:1 and the ratio of polymeric resin to crosslinking agent ranges from about 9.5:1 to about 12.5:1.

11. The coated abrasive product of claim 10, wherein the cured abrasive composition comprises:
    about 16 wt % to about 60 wt % polymeric resin;
    about 83 wt % to about 28 wt % green, unfired abrasive aggregates;
    about 0.5 wt % to about 4.0 wt % of crosslinking agent; and
    about 0.5 wt % to about 8.0 wt % of thixotropic agent.

12. The coated abrasive product of claim 11, wherein the cured abrasive composition further comprises about 0.5 to about 3.0 wt % of surfactant.

13. The coated abrasive product of claim 11, wherein the polymeric resin comprises about 4.0 wt % to about 25 wt % of polyester resin and the remainder is epoxy resin.

14. The coated abrasive product of claim 11, wherein the thixotropic agent comprises about 0.5 wt % to about 3.0 wt % of a first thixotrope and the remainder is a second thixotrope.

15. A coated abrasive product comprising:
    a backing; and
    an abrasive composition,
    wherein the abrasive composition comprises polymeric resin,
abrasive aggregates,
a crosslinking agent,
a thixotropic agent, and
wherein the abrasive aggregates are green, unfired and have a generally spheroidal or toroidal shape and are formed from a composition comprising abrasive grit particles and a nanoparticle binder, and
wherein the abrasive composition is applied to the backing, and
wherein the ratio of green, unfired abrasive aggregate to polymeric resin ranges from about 1.25:1 to about 2.25:1.

* * * * *

UNITED STATES PATENT AND TRADEMARK OFFICE
CERTIFICATE OF CORRECTION

PATENT NO. : 9,168,638 B2  
APPLICATION NO. : 13/630375  
DATED : October 27, 2015  
INVENTOR(S) : Manning et al.

Page 1 of 1

It is certified that error appears in the above-identified patent and that said Letters Patent is hereby corrected as shown below:

In the claims  
Column 21, Line 57, claim 1 delete "ration" and insert therefor --ratio--

Signed and Sealed this  
Twelfth Day of April, 2016

Michelle K. Lee  
*Director of the United States Patent and Trademark Office*